(12) United States Patent
Sharifi et al.

(10) Patent No.: US 12,321,433 B2
(45) Date of Patent: Jun. 3, 2025

(54) ADAPTIVE GUEST MODE FOR PORTABLE SPEAKERS

(71) Applicant: Google LLC, Mountain View, CA (US)

(72) Inventors: Matthew Sharifi, Kilchberg (CH); Victor Carbune, Zürich (CH)

(73) Assignee: Google LLC, Mountain View, CA (US)

( * ) Notice: Subject to any disclaimer, the term of this patent is extended or adjusted under 35 U.S.C. 154(b) by 314 days.

(21) Appl. No.: 18/061,207

(22) Filed: Dec. 2, 2022

(65) Prior Publication Data
US 2024/0184867 A1    Jun. 6, 2024

(51) Int. Cl.
| G06F 21/32 | (2013.01) |
| G06F 9/451 | (2018.01) |
| G06V 40/16 | (2022.01) |
| G10L 17/22 | (2013.01) |
| G06F 3/04842 | (2022.01) |
| G06F 3/16 | (2006.01) |

(52) U.S. Cl.
CPC .............. G06F 21/32 (2013.01); G06F 9/453 (2018.02); G06V 40/172 (2022.01); G10L 17/22 (2013.01); G06F 3/04842 (2013.01); G06F 3/167 (2013.01)

(58) Field of Classification Search
CPC ........ G06F 21/32; G06F 21/62; G06F 21/629; G06F 9/453; G06F 3/167; H04L 63/102; G10L 17/06; G10L 17/22
See application file for complete search history.

(56) References Cited

U.S. PATENT DOCUMENTS

| 2015/0341717 A1* | 11/2015 | Song | G10L 17/22 |
| | | | 381/110 |
| 2018/0247065 A1* | 8/2018 | Rhee | G06F 21/32 |
| 2019/0012444 A1* | 1/2019 | Lesso | G06F 3/165 |
| 2019/0206160 A1* | 7/2019 | Daniel-Wayman | G07C 9/21 |
| 2019/0318069 A1* | 10/2019 | Mitic | H04W 12/04 |
| 2019/0318070 A1* | 10/2019 | Mitic | G06F 21/31 |
| 2020/0143017 A1* | 5/2020 | Yoon | G06F 3/167 |
| 2020/0175292 A1* | 6/2020 | Casado | G06V 40/70 |
| 2020/0339142 A1* | 10/2020 | Aggarwal | B60W 50/10 |

(Continued)

OTHER PUBLICATIONS

International Search Report and Written Opinion issued in related PCT Application No. PCT/US2023/079467, dated Feb. 28, 2024.

Primary Examiner — Eric W Shepperd
(74) Attorney, Agent, or Firm — Honigman LLP; Brett A. Krueger; Grant Griffith

(57) ABSTRACT

A method for adapting a guest mode for portable speakers includes obtaining a current state of an assistant-enabled device while a guest mode is enabled. Here, the assistant-enabled device is configured to allow a digital assistant to fulfill queries spoken by speakers who are not enrolled users when the guest mode is enabled. Based on the current state of the assistant-enabled device, the method includes disabling the guest mode to suppress fulfillment of queries spoken by speakers who are not enrolled users. While the guest mode is disabled, the method includes receiving audio data corresponding to a query, the query including a command for the digital assistant to perform an action, performing speaker identification to determine that a speaker of the query is not an enrolled user, and based on determining that the speaker of the query is not an enrolled user, suppressing fulfillment of the action.

24 Claims, 7 Drawing Sheets

(56) References Cited

U.S. PATENT DOCUMENTS

| | | |
|---|---|---|
| 2020/0342881 A1 | 10/2020 | Casado |
| 2020/0367810 A1* | 11/2020 | Shouldice ................ H04R 1/08 |
| 2021/0204115 A1* | 7/2021 | Gorsica, IV ............ H04W 4/70 |
| 2022/0051663 A1 | 2/2022 | Sharifi et al. |
| 2022/0122612 A1* | 4/2022 | Fang ........................ G10L 17/02 |
| 2022/0165259 A1* | 5/2022 | Goel ........................ G10L 15/22 |
| 2022/0343935 A1* | 10/2022 | Harris .................. G10L 21/0232 |
| 2023/0292032 A1* | 9/2023 | Boothe ................ H04R 1/1041 |
| 2024/0111848 A1* | 4/2024 | Yoon .................. H04L 63/0853 |

\* cited by examiner

ADAPTIVE GUEST MODE FOR PORTABLE SPEAKERS

TECHNICAL FIELD

This disclosure relates to an adaptive guest mode for portable speakers.

BACKGROUND

A user's manner of interacting with an assistant-enabled device is designed primarily, if not exclusively, by means of voice input. For example, a user may ask a device to perform an action including media playback (e.g., music or podcasts), where the device responds by initiating playback of audio that matches the user's criteria. In instances where a device (e.g., a smart speaker) is in a public environment, the device may need to discern whether a user of the device or a guest is issuing requests.

SUMMARY

One aspect of the disclosure provides a computer-implemented method that when executed on data processing hardware causes the data processing hardware to perform operations that include obtaining a current state of an assistant-enabled device while a guest mode of the assistant-enabled device is enabled. The assistant-enabled device is configured to allow a digital assistant to fulfill queries spoken by speakers who are not enrolled users of the assistant-enabled device when the guest mode is enabled and suppress fulfillment of queries spoken by speakers who are not enrolled users of the assistant-enabled device when the guest mode is disabled. Based on the current state of the assistant-enabled device, the operations include disabling the guest mode of the assistant-enabled device. While the guest mode of the assistant-enabled device is disabled, the operations also include receiving audio data corresponding to a query captured by the assistant-enabled device, the query including a command for the digital assistant to perform an action, performing speaker identification to determine that a speaker of the query is not an enrolled user of the assistant-enabled device, and based on determining that the speaker of the query is not an enrolled user of the assistant-enabled device, suppressing fulfillment of the action.

Implementations of the disclosure may include one or more of the following optional features. In some implementations, the operations further include receiving sensor data captured by the assistant-enabled device. Here, obtaining the current state of the assistant-enabled device is based on the sensor data. In these implementations, the sensor data may include at least one of global positioning data, a signal strength of a wireless communication signal, image data, noise data, ambient context, connection data indicating the assistant-enabled device is connected to another device, or noise/speech data. Obtaining the current state of the assistant-enabled device based on the sensor data may include aggregating the sensor data to determine the current state of the assistant-enabled. In some examples, the operations further include determining a device setting of the assistant-enabled device. Here, determining the current state of the assistant-enabled device is based on the device setting of the assistant-enabled device. In some implementations, the operations further include adapting assistant features of the digital assistant based on disabling the guest mode of the assistant-enabled device.

In some examples, based on determining that the speaker of the query is not an enrolled user of the assistant-enabled device, the operations further include prompting the enrolled user of the assistant-enabled device to authorize fulfillment of the action associated with the query, receiving an acknowledgement from the enrolled user authorizing the fulfillment of the action, and performing the action based on the acknowledgement received from the enrolled user. In these examples, the operations may further include activating a temporary user account for the speaker of the query for a predetermined time. Here, the temporary user account allows the digital assistant to fulfill queries spoken by the speaker within the predetermined time when the guest mode of the assistant-enabled device is disabled. Additionally or alternatively, prompting the enrolled user includes providing, as output from a user interface of a user device associated with the enrolled user, a user-selectable option that when selected issues the acknowledgement from the enrolled user. Here, receiving the acknowledgement is based on receiving a user input indication indicating selection of the user-selectable option. In these examples, providing the user-selectable option as output from the user interface may include at least one of displaying, via the user interface, the user-selectable option as a graphical element on a screen of the user device associated with the enrolled user, or providing, via the user interface, the user-selectable option as an audible output from a speaker in communication with the user device associated with the enrolled user. Here, the user device associated with the enrolled user may include the assistant-enabled device.

In some implementations, performing speaker identification to determine that the speaker of the query is not an enrolled user of the assistant-enabled device includes extracting, from the audio data corresponding to the query, a first speaker-discriminative vector representing characteristics of the query, and determining that the extracted speaker-discriminative vector does not match any enrolled speaker vectors stored on the assistant-enabled device. Here, each enrolled speaker vector is associated with a different respective enrolled user of the assistant-enabled device. Based on determining that the first speaker-discriminative vector does not match one of the enrolled speaker vectors, the operations include determining that the query was not spoken by an enrolled user of the assistant-enabled device. In some examples, the operations further include receiving image data from an image device in communication with the data processing hardware, the image data including a face of the speaker of the query. Here, performing speaker identification to determine that the speaker of the query is not an enrolled user of the assistant-enabled device includes performing speaker identification on the received image data to determine that the speaker of the query is not an enrolled user of the assistant-enabled device.

Another aspect of the disclosure provides a system including data processing hardware and memory hardware in communication with the data processing hardware. The memory hardware stores instructions that when executed by the data processing hardware cause the data processing hardware to perform operations that include obtaining a current state of an assistant-enabled device while a guest mode of the assistant-enabled device is enabled. The assistant-enabled device is configured to allow a digital assistant to fulfill queries spoken by speakers who are not enrolled users of the assistant-enabled device when the guest mode is enabled and suppress fulfillment of queries spoken by speakers who are not enrolled users of the assistant-enabled device when the guest mode is disabled. Based on the current state of the assistant-enabled device, the operations include disabling the guest mode of the assistant-enabled device. While the guest mode of the assistant-enabled device is disabled, the operations also include receiving audio data corresponding to a query captured by the assistant-enabled device, the query including a command for the digital assistant to perform an action, performing speaker identification to determine that a speaker of the query is not an enrolled user of the assistant-enabled device, and based on determining that the speaker of the query is not an enrolled user of the assistant-enabled device, suppressing fulfillment of the action.

This aspect may include one or more of the following optional features. In some implementations, the operations further include receiving sensor data captured by the assistant-enabled device. Here, obtaining the current state of the assistant-enabled device is based on the sensor data. In these implementations, the sensor data may include at least one of global positioning data, a signal strength of a wireless communication signal, image data, noise data, ambient context, connection data indicating the assistant-enabled device is connected to another device, or noise/speech data. Obtaining the current state of the assistant-enabled device based on the sensor data may include aggregating the sensor data to determine the current state of the assistant-enabled. In some examples, the operations further include determining a device setting of the assistant-enabled device. Here, determining the current state of the assistant-enabled device is based on the device setting of the assistant-enabled device. In some implementations, the operations further include adapting assistant features of the digital assistant based on disabling the guest mode of the assistant-enabled device.

In some examples, based on determining that the speaker of the query is not an enrolled user of the assistant-enabled device, the operations further include prompting the enrolled user of the assistant-enabled device to authorize fulfillment of the action associated with the query, receiving an acknowledgement from the enrolled user authorizing the fulfillment of the action, and performing the action based on the acknowledgement received from the enrolled user. In these examples, the operations may further include activating a temporary user account for the speaker of the query for a predetermined time. Here, the temporary user account allows the digital assistant to fulfill queries spoken by the speaker within the predetermined time when the guest mode of the assistant-enabled device is disabled. Additionally or alternatively, prompting the enrolled user includes providing, as output from a user interface of a user device associated with the enrolled user, a user-selectable option that when selected issues the acknowledgement from the enrolled user. Here, receiving the acknowledgement is based on receiving a user input indication indicating selection of the user-selectable option. In these examples, providing the user-selectable option as output from the user interface may include at least one of displaying, via the user interface, the user-selectable option as a graphical element on a screen of the user device associated with the enrolled user, or providing, via the user interface, the user-selectable option as an audible output from a speaker in communication with the user device associated with the enrolled user. Here, the user device associated with the enrolled user may include the assistant-enabled device.

In some implementations, performing speaker identification to determine that the speaker of the query is not an enrolled user of the assistant-enabled device includes extracting, from the audio data corresponding to the query, a first speaker-discriminative vector representing characteristics of the query, and determining that the extracted speaker-discriminative vector does not match any enrolled speaker vectors stored on the assistant-enabled device. Here, each enrolled speaker vector is associated with a different respective enrolled user of the assistant-enabled device. Based on determining that the first speaker-discriminative vector does not match one of the enrolled speaker vectors, the operations include determining that the query was not spoken by an enrolled user of the assistant-enabled device. In some examples, the operations further include receiving image data from an image device in communication with the data processing hardware, the image data including a face of the speaker of the query. Here, performing speaker identification to determine that the speaker of the query is not an enrolled user of the assistant-enabled device includes performing speaker identification on the received image data to determine that the speaker of the query is not an enrolled user of the assistant-enabled device.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

A user's manner of interacting with an assistant-enabled device is designed primarily, if not exclusively, by means of voice input. For example, a user may ask a device to perform an action including media playback (e.g., music or podcasts), where the device responds by initiating playback of audio that matches the user's criteria. In instances where a device (e.g., a portable smart speaker) is commonly shared by multiple users in a given environment, the device may field actions requested by the multiple users (e.g., members of a household) as well as guest users that are temporarily visiting the environment. In these instances, a guest mode of the device allows the guest users to issue queries for the device to fulfill in a non-personalized manner.

In cases where the device is present in a public space, the multiple users may wish to limit unintended queries by a guest user. Here, disabling the guest mode prevents guest users from issuing queries to the device. When the device is a portable device that is easily moved between public and private spaces, the users may find that manually turning the guest mode on/off is cumbersome and time consuming. Additionally, the user of the device may inadvertently leave the guest mode on, thereby allowing unintended queries on the device while in a public space. Consequently, the device may adaptively/automatically toggle the guest mode between enabled and disabled the guest mode depending on the current context and environment of the device.

For instance, when a user of the device takes the device from a home environment (e.g., a private space) and enters an outdoor environment (e.g., a public park), the device may automatically disable the guest mode to avoid inadvertent queries by guest users. In some examples, a private space may become a public space by virtue of the number of people in the environment. In addition to enabling/disabling a guest mode of the device, the device adaptively/automatically toggle other features such as switching between work and personal accounts depending on a location of the device (i.e., at work or at home).

Figure 1A:
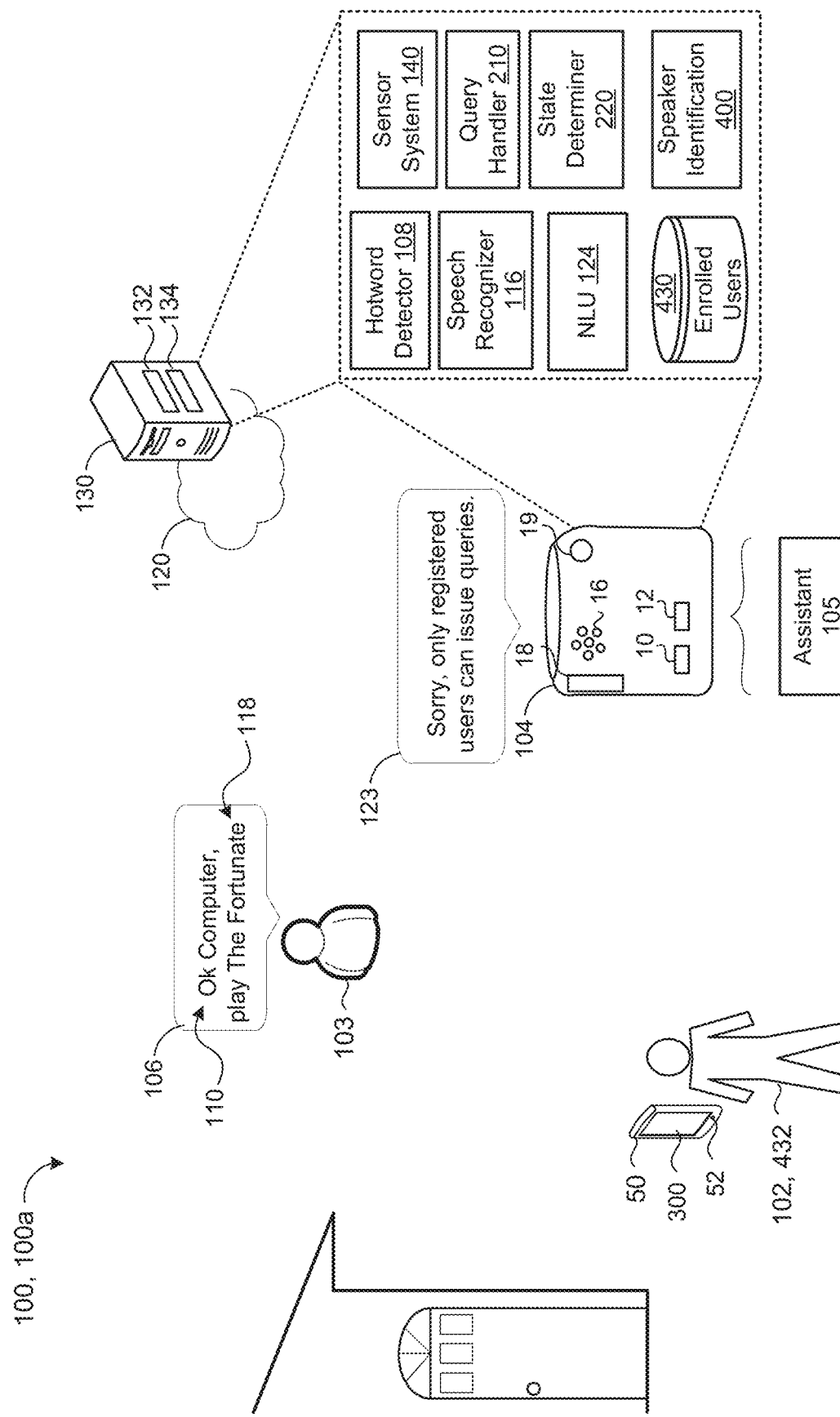
FIGS. 1A and 1B are schematic views of an example system including an assistant-enable device with an adaptive guest mode.
Figure 1B:
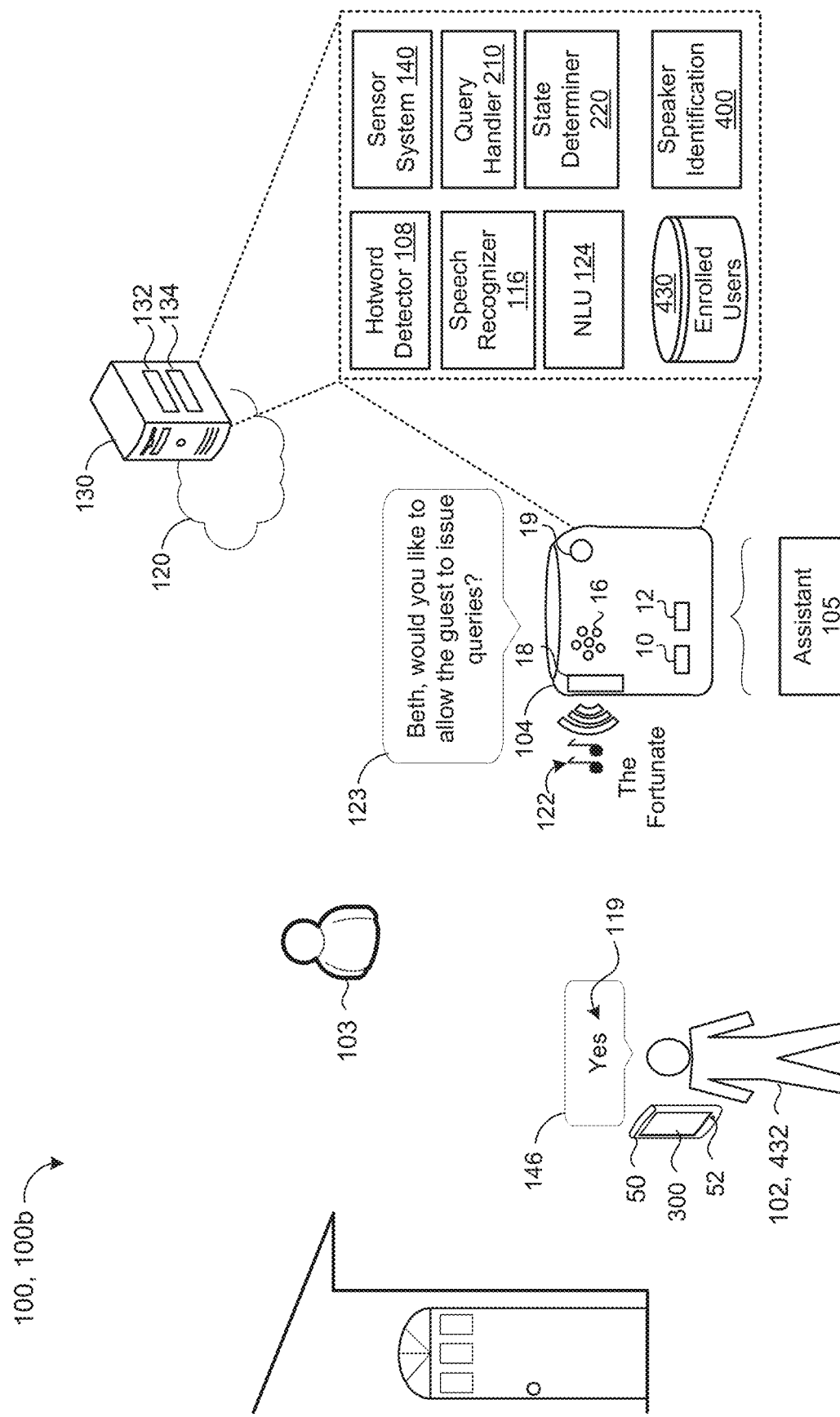

FIGS. 1A and 1B illustrate example systems 100a, 100b for an adaptive guest mode of an assistant-enabled device (AED) 104 of a user 102 that is automatically toggled between enabled/disabled according to an environment of the AED 104. Briefly, and as described in more detail below, a state determiner 220 (FIG. 2) of the AED 104 detects a current state 222 of the AED 104, and, based on the current state 222 of the AED 104, prompts a query handler 210 to disable the guest mode of the AED 104. While the guest mode of the AED 104 is disabled, the AED 104 suppresses performance of the respective action to play music in response to receiving a first query 106, "Ok computer, play The Fortunate," issued by a guest user 103 that is not an enrolled user 432 of the AED 104.

Figure 4:
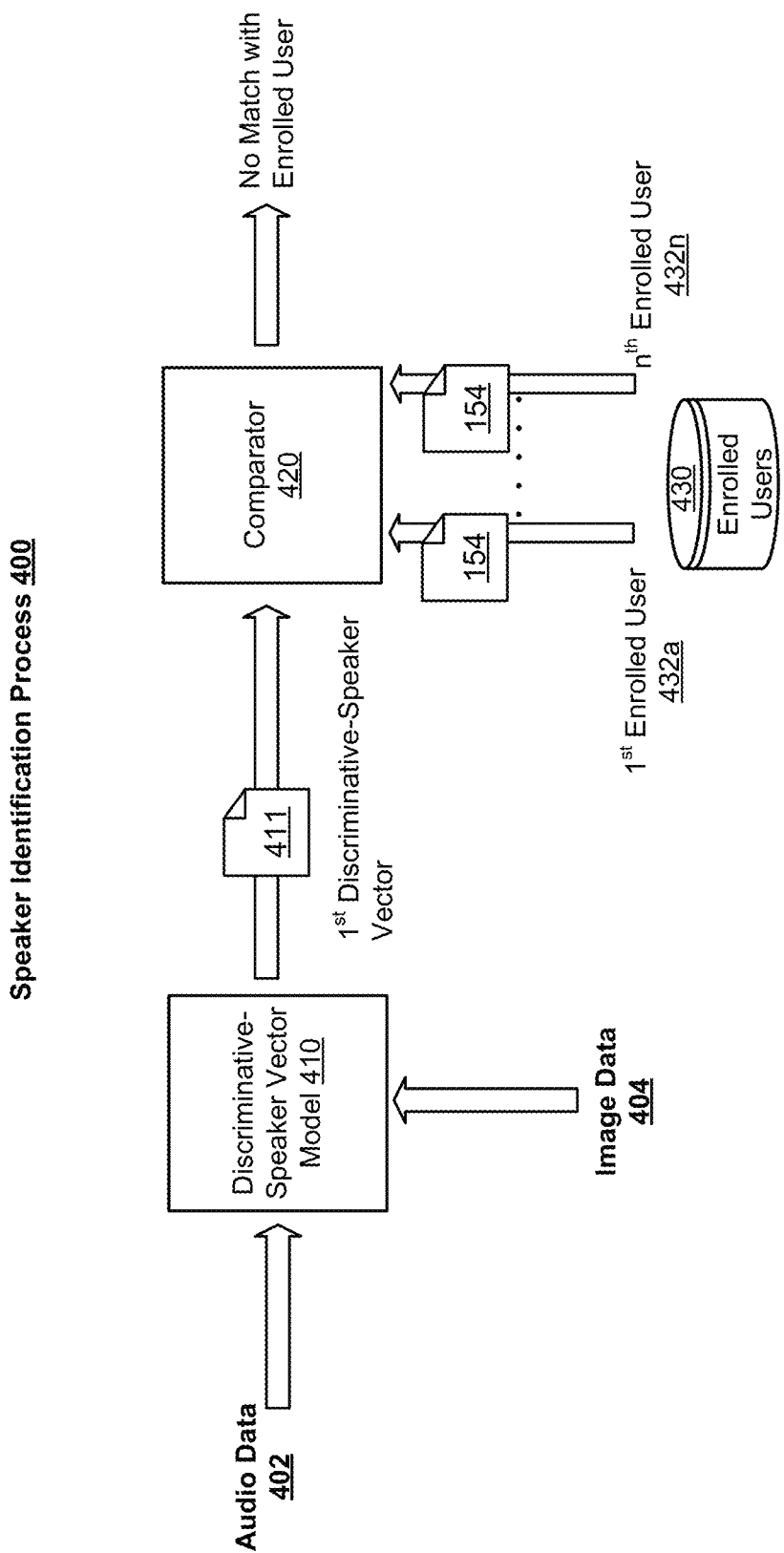
FIG. 4 is a schematic view of a speaker identification process.

The systems 100a, 100b include the AED 104 executing a digital assistant 105 that users 102 of the AED 104 may interact with by issuing queries including commands to perform an action. In the example shown, the AED 104 corresponds to a portable smart speaker that the users 102 may interact with and move between environments (e.g., public and private environments). However, the AED 104 can include other computing devices, such as, without limitation, a smart phone, tablet, smart display, desktop/laptop, smart watch, smart glasses/headset, smart appliance, headphones, or vehicle infotainment device. The AED 104 includes data processing hardware 10 and memory hardware 12 storing instructions that when executed on the data processing hardware 10 cause the data processing hardware 10 to perform operations. In some examples, the AED 104 is configured to communicate with a remote system 130 via a network 120. The remote system 130 may include remote resources, such as remote data processing hardware 132 (e.g., remote servers or central processing units (CPUs)) and/or remote memory hardware 134 (e.g., remote databases or other storage hardware). The AED 104 includes an array of one or more microphones 16 configured to capture acoustic sounds such as speech directed toward the AED 104. The AED 104 may also include, or be in communication with, an audio output device (e.g., speaker) 18 that may output audio such as music 122 and/or synthesized speech from the digital assistant 105. Additionally, the AED 104 may include, or be in communication with, one or more cameras 19 configured to capture images within the environment and output image data 404 (FIG. 4).

In some configurations, the AED 104 is in communication with a user device 50 associated with the user 102. In the examples shown, the user device 50 includes a smart phone that the user 102 may interact with. However, the user device 50 can include other computing devices, such as, without limitation, a smart watch, smart display, smart glasses, a smart phone, smart glasses/headset, tablet, smart appliance, headphones, a computing device, a smart speaker, or another assistant-enabled device. The user device 50 may include at least one microphone 52 residing on the user device 50 that is in communication with the AED 104. In these configurations, the user device 50 may also be in communication with the one or more microphones 16 residing on the AED 104. Additionally, the user 102 may control and/or configure the AED 104, as well as interact with the digital assistant 105, using an interface 300, such as a graphical user interface (GUI) 300 rendered for display on a screen of the user device 50. In some implementations, the user device 50 includes the AED 104. For instance, the AED 104 may be a tablet and/or smart speaker that is also the user device 50.

In some implementations, the query handler 210 of the AED 104 automatically enables/disables an adaptive guest mode based on a current state 222 of the AED 104. For example, when the guest mode is enabled, the query handler 210 is configured to allow the digital assistant 105 to fulfill queries spoken by speakers who are not enrolled users 432 of the AED 104. In other words, when the guest mode is enabled, the AED 104 may allow the digital assistant 105 to fulfill any queries detected by the AED 104. Conversely, when the guest mode is disabled, the query handler 210 is configured to suppress fulfillment of queries spoken by speakers who are not enrolled users 432 of the AED 104. The adaptive guest mode of the query handler 210 may be configured by the user 102 when the user 102 sets up the AED 104. Alternatively, the adaptive guest mode of the query handler 210 may be automatically configured by the manufacturer of the AED 104 as a default setting.

In some examples, disabling the guest mode includes adapting assistant features of the digital assistant 105. For example, when the AED 104 is in a public setting, in addition to preventing guest users from querying the AED 104, the features of the digital assistant 105 are adapted to remove personalization that might be considered private information of the user 102 of the AED 104. For instance, the synthesized speech generated by the digital assistant 105 for audible output from the speaker 18 of the AED 104 may be in a generic voice profile rather than voice profile selected by the user 102. Similarly, segments of the synthesized speech generated by the digital assistant 105 may be redacted to ensure sensitive information is not output from the speaker 18. Moreover, personalization features for types of content may be removed, or entire types of content may be removed. For example, preferences for certain types of music may be removed when the guest mode is disabled.

The AED 104 includes a sensor system 140 configured to capture sensor data 142 within the environment of the AED 104, which may indicate a current state 222 of the AED 104. In other words, the current state 222 of the AED 104 may be based on the captured sensor data 142. The AED 104 may continuously, or at least during periodic intervals, receive the sensor data 142 captured by the sensor system 140 to determine the current state 222 of the AED 104. In some implementations, a state determiner 220 of the AED 104 aggregates the captured sensor data 142 to determine the current state 222 of the AED 104. Here, the state determiner 220 may include a single machine learning model (e.g., a deep neural network) that receives, as input, the captured sensor data 142 and generates, as output, the current state 222 of the AED 104. In other examples, the state determiner 220 includes multiple machine learning models that receive respective sensor data 132 as input and generate, as output, a classification for the respective sensor data [132] 142 that may be aggregated to generate the current state 222 of the AED 104.

Some examples of sensor data 142 include global positioning data, signal strength data, motion data, image data, connection data, noise data, speech data, ambient context, or other data indicative of a state of the AED 104 or state of the environment in the vicinity of the AED 104. With global positioning data, system(s) associated with the AED 104 may detect a location and/or directionality of the AED 104. Signal strength data includes wireless communication signals (i.e., signal data), such as Bluetooth or Ultrasonic, which represent other computing devices (e.g., other user devices) in proximity to the AED 104. Motion data may include accelerometer data that characterizes movement of the AED 104 via movement of the AED 104. Image data (e.g., image data 404) may be used to detect features of users 102 (e.g., a gesture by a user 102 or facial features to characterize a gaze of a user 102) in proximity to the AED 104 and/or features of the environment of the AED 104. Connection data may be used to determine whether the AED 104 is connected with other electronics or devices (e.g., docked with a vehicle infotainment system or headphones). Acoustic data, such as noise data or speech data, may be captured by the sensor system 140 and used to determine the environment of the AED 104 (e.g., characteristics or properties of the environment that have particular acoustic signatures) or identify whether the user 102 or another party is speaking. Ambient context, such as whether the AED 104 is indoors or outdoors may be detected and inferred through the microphone 16 of the AED 104.

Figure 2:
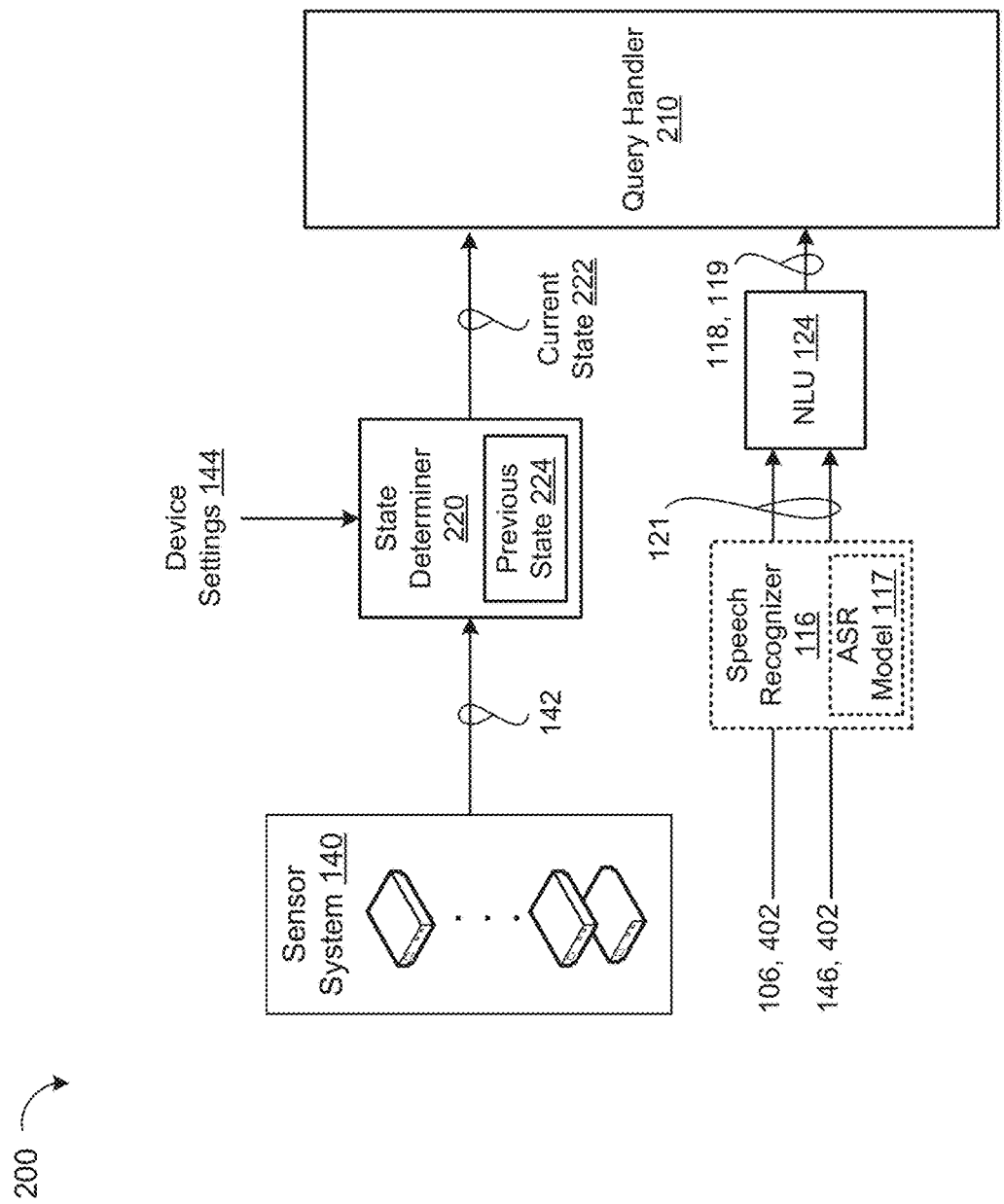
FIG. 2 is an example environment detection process for the adaptive guest mode.

Referring to schematic view 200 of FIG. 2, in some implementations, the AED 104 executes the query handler 210 and the state determiner 220, which automatically adapt the guest mode of the AED 104 based on the current state 222 of the AED 104. That is, the state determiner 220 determines the current state 222 of the AED 104 and the query handler 210 automatically toggles the guest mode between enabled and disabled based on the current state 222 of the AED 104. The state determiner 220 may be configured to identify a current state 222 of the AED 104 based on the sensor data 132 collected by the sensor system 140. In other words, the state determiner 220 uses sensor data 142 to derive/ascertain the current state 222 of the AED 104. For instance, current sensor data 142 (or the most recent sensor data 142) is representative of the current state 222 of the AED 104. Moreover, the state determiner 220 may consider the device settings 144 (e.g., do not disturb, bedtime, sound volume, etc.,) of the AED 104 when determining the current state 222 of the AED 104.

In some implementations, the state determiner 220 maintains a record of a previous state 224 of the AED 104. Here, a previous state 224 may refer to a state of the AED 104 that is characterized by sensor data 142 that is not the most recent (i.e., most current) sensor data 142 from the sensor system 140. For example, the previous state 224 of the AED 104 may be stationary in a home environment surrounded by enrolled users 432 of the AED 104. Because the AED 104 is in a home environment (i.e., a private environment), the guest mode may be enabled to allow guests to submit queries to the AED 104. In this example, after receiving the most current sensor data 142, the state determiner 220 may determine that the current state 222 of the AED 104 is moving in a noisy and/or busy environment (i.e., an outdoor environment). This change between the previous state 224 and the current state 222 of the AED 104 triggers the query handler 210 of the AED 104 to automatically toggle the guest mode of the AED 104 from enabled to disabled to prevent fulfilling queries spoken by guest users. If, however, the state determiner 220 determines that the previous state 224 and the current state 222 are the same, the state determiner 220 may not send the current state 222 to the query handler 210, and the query handler 210 does not change the guest mode from enabled.

In some examples, the state determiner 220 only outputs the current state 222 to the query handler 210 (thereby triggering the query handler 210 to automatically enable/disable the guest mode) when there is a difference (e.g., difference in sensor data 142) detected between the previous state 224 and the current state 222. For instance, the state determiner 220 may be configured with a state change threshold and, when the difference detected between the previous state 224 and the current state 222 satisfies the state change threshold (e.g., exceeds the threshold), the state determiner 220 outputs the current state 222 to the query handler 210. The threshold may be zero, where the slightest difference between the previous state 224 and the current state 222 detected by the state determiner 220 may trigger the query handler 210 of the AED 104 to automatically enable/disable the guest mode of the AED 104. Conversely, the threshold may be higher than zero to prevent unnecessary triggering of the query handler 210 toggling the guest mode as a type of user-interruption sensitivity mechanism.

Referring FIG. 4, in some implementations, the AED 104 (or the remote system 130 in communication with the AED 104) also includes an example data store 430 storing enrolled user data/information for each of multiple enrolled users 432a-n of the AED 104. Here, each enrolled user 432 of the AED 104 may undertake a voice enrollment process to obtain a respective enrolled speaker vector 154 from audio samples of multiple enrollment phrases spoken by the enrolled user 432. For example, a speaker-discriminative model 410 may generate one or more enrolled speaker vectors 154 from the audio samples of enrollment phrases spoken by each enrolled user 432 that may be combined, e.g., averaged or otherwise accumulated, to form the respective enrolled speaker vector 154. One or more of the enrolled users 432 may use the AED 104 to conduct the voice enrollment process, where the microphone 16 captures the audio samples of these users speaking the enrollment utterances and the speaker-discriminative model 410 generates the respective enrolled speaker vectors 154 therefrom. The model 410 may execute on the AED 104, the remote system 130, or a combination thereof. Additionally, one or more of the enrolled users 432 may enroll with the AED 104 by providing authorization and authentication credentials to an existing user account with the AED 104. Here, the existing user account may store enrolled speaker vectors 154 obtained from a previous voice enrollment process with another device also linked to the user account.

In some examples, the enrolled speaker vector 154 for an enrolled user 432 includes a text-dependent enrolled speaker vector. For instance, the text-dependent enrolled speaker vector may be extracted from one or more audio samples of the respective enrolled user 432 speaking a predetermined term such as the hotword 110 (e.g., "Ok computer") used for invoking the AED 104 to wake-up from a sleep state. In other examples, the enrolled speaker vector 154 for an enrolled user 432 is text-independent obtained from one or more audio samples of the respective enrolled user 102 speaking phrases with different terms/words and of different lengths. In these examples, the text-independent enrolled speaker vector may be obtained over time from audio samples obtained from speech interactions the user 102 has with the AED 104 or other device linked to the same account.

Referring again to FIGS. 1A and 1B, the state determiner 220 may identify that the AED 104 is in an outdoor environment via sensor data 142 obtained by the sensor system 140. In this example, the previous state 224 of the AED 104 may be a private environment (e.g., inside a home of a user 102 of the AED 104), where the guest mode is enabled, thereby allowing both guests and enrolled users 430 to submit queries to the AED 104. Based on detecting that the current state 222 of the AED 104 is an outdoor environment that is different than the previous state 224 (i.e., the private environment), the query handler 210 automatically disables the guest mode of the AED 104. While the guest mode is disabled, the AED 104 is configured to suppress fulfillment of queries spoken by speakers that are not enrolled users 430 of the AED 104.

Continuing with the example in FIG. 1A, a guest user 103 is shown issuing a query 106, "Ok computer, play The Fortunate" in the vicinity of the AED 104. Here, the query 106 issued by the guest user 103 is spoken and includes audio data 402 (FIGS. 2 and 4) corresponding to the query 106. The query 106 may further include a user input indication indicating a user intent to issue the first query, via any one or of touch, speech, gesture, gaze, and/or an input device (e.g., mouse or stylus) for interacting with the AED 104. Because the guest mode of the AED 104 is disabled, based on receiving the audio data 402 corresponding to the query 106, the AED 104 resolves the identity of the speaker of the query 106 by performing a speaker identification process 400 (FIG. 4) on the audio data 402 to determine whether the speaker of the query 106 is an enrolled user 432 of the AED 104.

The microphone 16 of the AED 104 receives the query 106 and processes the audio data 402 that corresponds to the query 106. The initial processing of the audio data 402 may involve filtering the audio data 402 and converting the audio data 402 from an analog signal to a digital signal. As the AED 104 processes the audio data 402, the AED may store the audio data 402 in a buffer of the memory hardware 12 for additional processing. With the audio data 402 in the buffer, the AED 104 may use a hotword detector 108 to detect whether the audio data 402 includes the hotword. The hotword detector 108 is configured to identify hotwords that are included in the audio data 402 without performing speech recognition on the audio data 402.

In some implementations, the hotword detector 108 is configured to identify hotwords that are in the initial portion of the query 106. In this example, the hotword detector 108 may determine that the query 106 "Ok computer, play The Fortunate" includes the hotword 110 "ok computer" if the hotword detector 108 detects acoustic features in the audio data 402 that are characteristic of the hotword 110. The acoustic features may be mel-frequency cepstral coefficients (MFCCs) that are representations of short-term power spectrums of the first query 106 or may be mel-scale filterbank energies for the query 106. For example, the hotword detector 108 may detect that the query 106 "Ok computer, play The Fortunate" includes the hotword 110 "ok computer" based on generating MFCCs from the audio data 402 and classifying that the MFCCs include MFCCs that are similar to MFCCs that are characteristic of the hotword "ok computer" as stored in a hotword model of the hotword detector 108. As another example, the hotword detector 108 may detect that the query 106 "Ok computer, play The Fortunate" includes the hotword 110 "ok computer" based on generating mel-scale filterbank energies from the audio data 402 and classifying that the mel-scale filterbank energies include mel-scale filterbank energies that are similar to mel-scale filterbank energies that are characteristic of the hotword "ok computer" as stored in the hotword model of the hotword detector 108.

When the hotword detector 108 determines that the audio data 402 that corresponds to the first query 106 includes the hotword 110, the AED 104 may trigger a wake-up process to initiate speech recognition on the audio data 402 that corresponds to the first query 106. For example, FIGS. 1A-2 show the AED 104 including a speech recognizer 116 employing an automatic speech recognition model 117 that may perform speech recognition or semantic interpretation on the audio data 402 that corresponds to the query 106. The speech recognizer 116 may perform speech recognition on the portion of the audio data 402 that follows the hotword 110. In this example, the speech recognizer 116 may identify the words "play The Fortunate" in the query 106.

The AED 104 may utilize the remote resources (e.g., the remote system 130) to perform various functionality related to speech processing and/or synthesized playback communication. In some implementations, the speech recognizer 116 is located on the remote system 130 in addition to, or in lieu, of the AED 104. Upon the hotword detector 108 triggering the AED 104 to wake-up responsive to detecting the hotword 110 in the query 106, the AED 104 may transmit the audio data 402 corresponding to the query 106 to the remote system 130 via the network 120. Here, the AED 104 may transmit the portion of the audio data 402 that includes the hotword 110 for the remote system 130 to confirm the presence of the hotword 110. Alternatively, the AED 104 may transmit only the portion of the audio data 402 that corresponds to the portion of the query 106 after the hotword 110 to the remote system 130, where the remote system 130 executes the speech recognizer 116 to perform speech recognition and returns a transcription 121 of the audio data 402 to the AED 104.

With continued reference to FIGS. 1A-2, the AED 104 may further include natural language understanding (NLU) module 124 that performs semantic interpretation on the transcription 121 of the query 106 to identify the command directed toward the AED 104. Specifically, the NLU module 124 identifies the words in the utterance 106 identified by the speech recognizer 116, and performs semantic interpretation to identify any speech commands in the utterance 106. The NLU module 124 of the AED 104 (and/or the remote system 130) may identify the words "play The Fortunate" as a command 118 specifying an action (i.e., play music 122) for the digital assistant 105 to perform.

Referring again FIG. 4, the AED 104 may trigger the speaker identification process 400 to determine whether the speaker of the query 106 is an enrolled user 432 of the AED 104. The speaker identification process 400 determines whether the speaker of the query 106 is an enrolled user 432 by first extracting, from the audio data 402 corresponding to the query 106, a first speaker-discriminative vector 411 representing characteristics of the query 106 issued by the guest user 103. Here, the speaker identification process 400 may execute the speaker-discriminative model 410 configured to receive the audio data 402 corresponding to the query 106 as input and generate, as output, the first speaker-discriminative vector 411. The speaker-discriminative model 410 may be a neural network model trained under machine or human supervision to output speaker-discriminative vectors 411. The speaker-discriminative vector 411 output by the speaker-discriminative model 410 may include an N-dimensional vector having a value that corresponds to speech features of the query 106 that are associated with the guest user 103. In some examples, the speaker-discriminative vector 411 is a d-vector. In some examples, the first speaker-discriminative vector 411 includes a set of speaker-discriminative vectors each associated with a different user who is also authorized to control the AED 104. For instance, aside from the guest user 103 that spoke the query 106, different users could include other individuals who were present when the guest user 103 spoke the query 106 and/or individuals that the AED 104 has added/specified as being authorized.

Once the first speaker-discriminative vector 411 is output from the model 410, the speaker identification process 400 determines whether the extracted speaker-discriminative vector 411 matches any of the enrolled speaker vectors 154 stored on the AED 104 (e.g., in the memory hardware 12) for the enrolled users 432a-n of the AED 104. As described above, the speaker-discriminative model 410 may generate the enrolled speaker vectors 154 for the enrolled users 200 during a voice enrollment process. Each enrolled speaker vector 154 may be used as a reference vector 155 corresponding to a voiceprint or unique identifier representing characteristics of the voice of the respective enrolled user 432.

In some implementations, the speaker identification process 400 uses a comparator 420 that compares the first speaker-discriminative vector 411 to the respective enrolled speaker vector 154 associated with each enrolled user 432a-n of the AED 104. Here, the comparator 420 may generate a score for each comparison indicating a likelihood that the initial audio data 402 corresponding to the query 106 corresponds to an identity of the respective enrolled user 432, and the identity is accepted when the score satisfies a threshold. When the score does not satisfy the threshold, the comparator 420 may reject the identity of the speaker that issued the query 106. In some implementations, the comparator 420 computes a respective cosine distance between the first speaker-discriminative vector 411 and each enrolled speaker vector 154 and determines the first speaker-discriminative vector 411 matches one of the enrolled speaker vectors 154 when the respective cosine distance satisfies a cosine distance threshold.

In some examples, the first speaker-discriminative vector 411 is a text-dependent speaker-discriminative vector extracted from a portion of one or more words that correspond to the query 106 and each enrolled speaker vector 154 is also text-dependent on the same one or more words. The use of text-dependent speaker vectors can improve accuracy in determining whether the first speaker-discriminative vector 411 matches any of the enrolled speaker vectors 154. In other examples, the first speaker-discriminative vector 411 is a text-independent speaker-discriminative vector extracted from the entire audio data 402 that corresponds to the query 106.

Optionally, the AED 104 performs speaker identification 400 to determine an identity of the speaker of the query 106 based on the image data 404 through facial recognition. For example, in addition to receiving the audio data 402 of the query 106, the speaker-discriminative model 410 may receive image data 404 captured by one or more cameras 19 of the AED 104. Here, the captured image data 404 may include a face/facial image of the speaker of the query 106. The facial image for the speaker of the query 106 may be extracted from the image data 404, where the AED 104 performs speaker identification 400 on the received image data 404 to determine that the speaker of the query 106 is not an enrolled user 432 of the AED 104. For example, each of the enrolled users 432 stored in the data store 430 may include an enrolled facial vector corresponding to a unique identifier representing characteristics of the face of the respective enrolled user 432. Here, when performing speaker identification 400, the AED 104 may compare the received image data 404 to the enrolled facial vectors corresponding to each of the enrolled users 432 and determine that the speaker of the query 106 is not an enrolled user 432 of the AED 104 when the image data 404 does not match any of the enrolled facial vectors of the enrolled users 432.

In implementations where the sensor data 142 indicates that the AED 104 is connected with other electronics or devices, the AED 104 may be grouped with the connected devices to form an expanded speaker identification process. In these implementations, the speaker identification process 400 leverages the enrolled speaker vectors 154 from across each of the connected devices to determine whether the query 106 was issued by an enrolled user 432 of any of the connected devices. Here, each device in the connected devices performs its own speaker identification against its data store 430 of enrolled speaker vectors 154 rather than each individual connected device sharing its respective enrolled speaker vectors 154 with the AED 104 for the AED 104 to perform speaker verification 400.

When the speaker identification process 400 determines that the first speaker-discriminative vector 411 does not match any of the enrolled speaker vectors 154, the process 400 may identify the guest user 103 that spoke the query 106 as a guest user of the AED 104. Here, because the guest mode of the AED 104 is disabled and the speaker of the query 106 is not an enrolled user 432 of the AED 104, the query handler 210 suppresses fulfillment (via the digital assistant 105) of the query 106. Referring again to FIG. 1A, the AED 104 may notify the guest user 103 that spoke the query 106 that the query 106 will not be fulfilled. For instance, the digital assistant 105 may generate synthesized speech 123 for audible output from the speaker 18 of the AED 104 that states, "Sorry, only registered users can issue queries".

Figure 3:
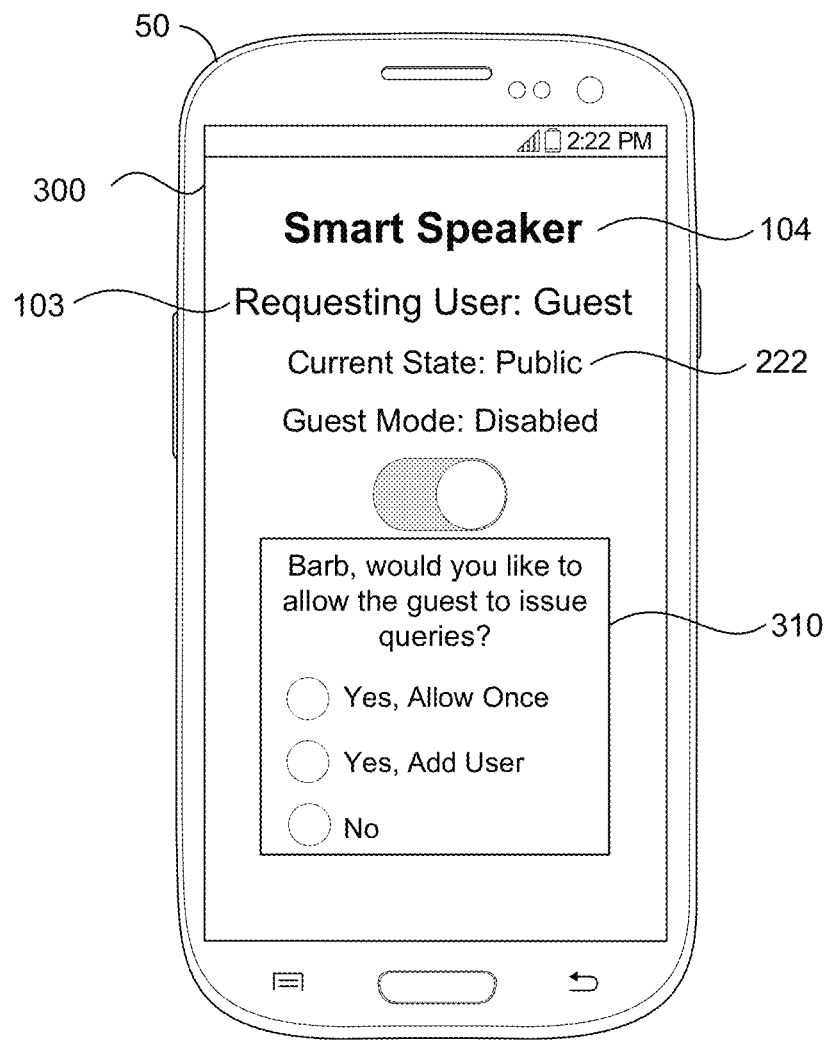
FIG. 3 is an example graphical user interface (GUI) rendered on a screen of a user device.

FIG. 3 provides an example GUI 300 displayed on a screen of the user device 50 to inform the user 102 of a status of the AED 104. As shown, the GUI 300 may render for display an identifier of the AED 104 (e.g., smart speaker), an identity of the requesting user (e.g., guest user 103), an identifier of the current state of the AED 104 (e.g., public or private), and/or an identifier of the guest mode (e.g., disabled). In some implementations, the identifier of the guest mode includes a toggle that the user 102 of the user device 50 may use to toggle the guest mode between enabled and disabled. By identifying the state of the AED 104 and the guest mode, the GUI 300 keeps the user 102 apprised of the changing state of the AED 104 as it moves between environments.

Referring to FIG. 1B, though the guest mode of the AED 104 is disabled, an enrolled user 432 of the AED 104 may override the guest mode setting and allow the digital assistant 105 to perform the action associated with the query 106. Here, the AED 104 may detect that an enrolled user 432 (i.e., user 102) is present within the environment of the AED 104 and verify whether the detected enrolled user 432 wishes to override the guest mode of the AED 104. AED 104 may detect the presence of the enrolled user 432 for example, via audio data 402 captured by the microphone 16, image data 404 of the environment captured by the camera 19, and/or by detecting an audible/inaudible signal emitted by the device 50 of the user. In the example shown, because the AED 104 detects/recognizes that an enrolled user 432 is present in the environment (i.e., user 102), the query handler 210 (via the digital assistant 105) prompts the enrolled user 432 to authorize fulfillment of the action associated with the query 106 submitted by the identified guest user 103.

The digital assistant 105 may request approval from an enrolled user 432 by generating synthesized speech 123 for audible output from the speaker 18 of the AED 104 that prompts the enrolled user 432 to authorize or reject the performance of the respective action associated with detected command 118 "play The Fortunate". For instance, the digital assistant 105 may generate synthesized speech 123 for audible output from the speaker 18 of the AED 104 that asks, "Barb, would you like to allow the guest to issue queries?" In response, Barb 432 speaks an utterance 146 that includes an acknowledgement 119. The acknowledgement 119 by the user 102 may be "yes" to authorize performance of the respective action, or "no" to reject performance of the respective action.

In the example shown, Barb 432 utters the acknowledgement 119 "yes" that corresponds to authorizing the performance of the respective action associated with the warm word 112 "stop". In some implementations, the AED 104 also performs the speaker identification process 400 on audio data 402 corresponding to the utterance 146 to verify that the acknowledgement 119 was spoken by the enrolled user 432 (e.g., Barb) of the AED 104. Based on receiving the acknowledgement 119 "yes" from Barb 432 authorizing performance of the respective action "play The Fortunate" and the speaker identification process 400 performed on the audio data 402 corresponding to the utterance 146 indicating that the utterance 148 was spoken by Barb 102, the AED 104 may proceed with performing the respective action associated with the identified action "play The Fortunate" spoken by the guest user 103. In the example shown, the digital assistant 105 begins to perform the action of playing music 122 (i.e., The Fortunate) as playback audio from the speaker 18 of the AED 104. The digital assistant 105 may stream the music 122 from a streaming service (not shown) or the digital assistant 105 may instruct the AED 104 to play music stored on the AED 104. Conversely, when the speaker identification process 400 performed on the audio data 402 corresponding to the utterance 146 indicates that the utterance 146 was not spoken by Barb 432 or when the acknowledgement 119 spoken by Barb 432 was instead "no", the AED 104 may suppress performance of the respective action "play The Fortunate" so that the AED 104 does not play music 122.

Additionally or alternatively to audibly prompting the enrolled user 432, the digital assistant 105 may provide a notification to the user device 50 associated with the enrolled user 432 (i.e., Barb) that prompts the enrolled user 432 to authorize or reject the performance of the respective action "play The Fortunate" spoken by the guest user 103. For instance as shown in FIG. 3, the GUI 300 displayed on the user device 50 may render the prompt as a notification to allow Barb 432 to authorize or reject the performance of the respective action "play The Fortunate". In one example, the GUI 300 renders graphical elements/buttons 310 that the enrolled user 432 may select to authorize or reject the performance of the respective action. As shown, the graphical elements 310 include a graphical element for "yes, allow once," "yes, add user," and "no". In response to the prompt, the enrolled user 432 may provide a user input indication indicating selection of one of the graphical elements 310 for the acknowledgement 119 "yes" (e.g., by touching the graphical element for "yes, allow once" or "yes, add user" in the GUI 300) that corresponds to authorizing the performance of the respective action "play The Fortunate". In response to receiving the user input indication indicating selection of one of the graphical elements 310 for the acknowledgement 119 "yes" by the enrolled user 432, the AED 104 may proceed with performing the respective action "play The Fortunate" spoken by the guest user 103. Conversely, Barb 102 may provide a user input indication indicating selection of a graphical element 310 for the acknowledgement 119 "no" (e.g., by touching the graphical element for "no" in the GUI 300) to reject the performance of the respective action "play The Fortunate" spoken by the guest user 103, and thereby cause the AED 104 to suppress performance of the respective action.

In some implementations, the enrolled user 432 provides the user input indication indicating selection of the graphical element 310 for the acknowledgement 119 "yes" (e.g., by touching the graphical element for "yes, allow once" in the GUI 300), thereby issuing the acknowledgement from the enrolled user 432. Here, the enrolled user 432 authorizes the guest user 103 request to play music 122 but rejects future control of the AED 104 by the guest user 103. The enrolled user 432 may also have the ability to authorize the guest user 103 to control the AED 104 for a predetermined period of time (e.g., one hour, one day, etc.). For instance, the enrolled user 432 provides the user input indication indicating selection of the graphical element 310 for the acknowledgement 119 "yes" (e.g., by touching the graphical element for "yes, add user" in the GUI 300). Here, the enrolled user 432 authorizes the guest user 103 request to play music 122 and additionally activates a temporary user account for the guest user 103 that spoke the query 106. In other words, while the guest mode is disabled, the enrolled user 432 may add a guest as a temporary user that may issue queries to the AED 104. In these examples, the temporary user account may allow the AED 104 (via the digital assistant 105) to fulfill queries spoken by the guest user 103 for a predetermined period of time (e.g., until a change in state is detected by the state determiner 220) when the guest mode of the AED 104 is disabled. In some implementations, when the enrolled user 432 activates a temporary user account for the guest user 103, the AED 104 may temporary enroll the guest user 103 and store the first speaker-discriminative vector 411 as a respective enrolled speaker vector 154 for the temporary user account for the guest user 103.

Figure 5:
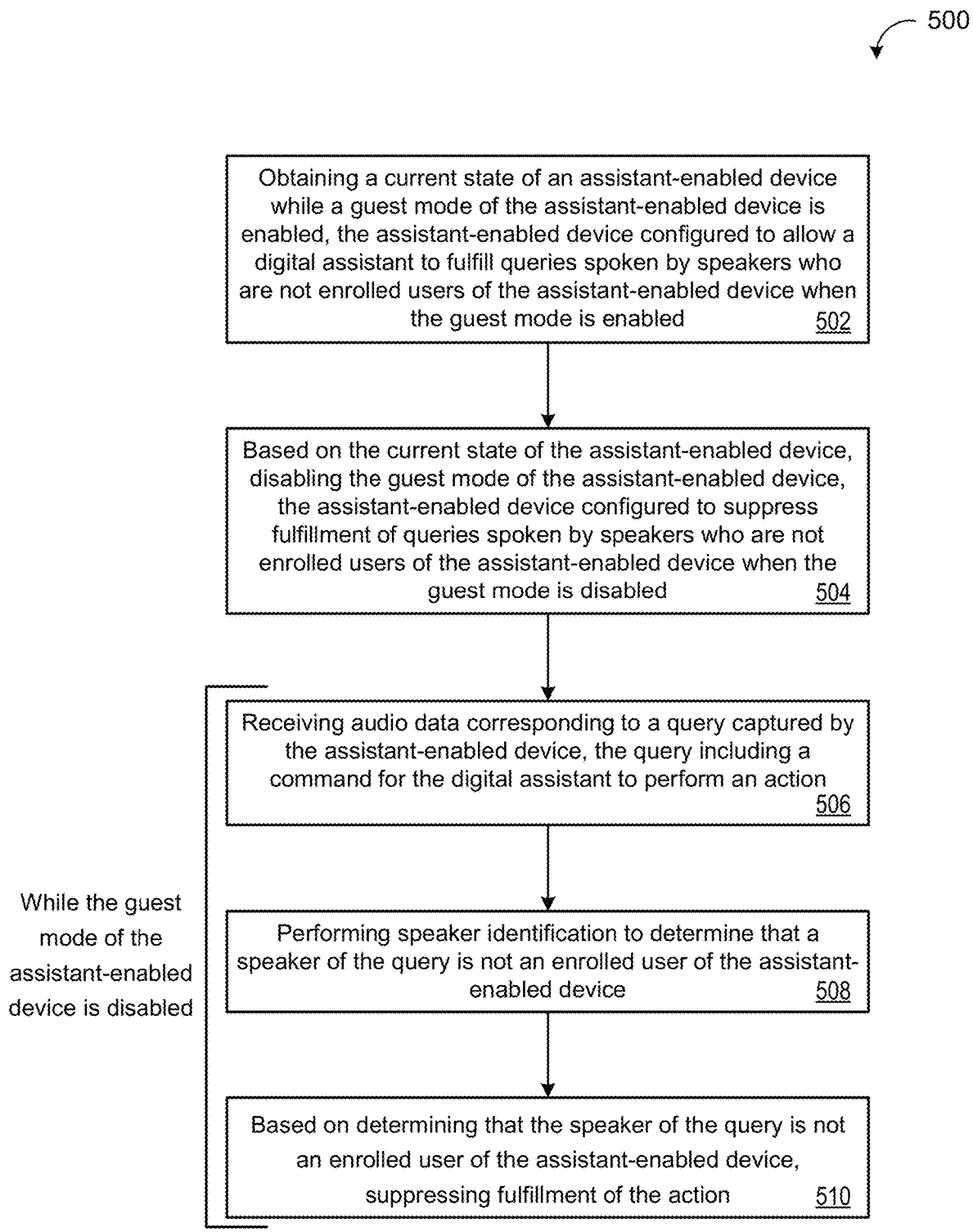
FIG. 5 is a flowchart of an example arrangement of operations for a method of adapting a guest mode of a portable speaker.

FIG. 5 includes a flowchart of an example arrangement of operations for a method 500 of adapting a guest mode for an assistant-enable device 104. The operations performed by the method 500 may be described with reference to FIGS. 1-4. At operation 502, the method 500 includes obtaining a current state 222 of an assistant-enabled device 104 while a guest mode of the assistant-enabled device 104 is enabled. Here, the assistant-enabled device 104 is configured to allow a digital assistant 105 to fulfill queries spoken by speakers who are not enrolled users 432 of the assistant-enabled device 104 when the guest mode is enabled.

Based on the current state 222 of the assistant-enabled device 104, the method 500 includes, at operation 504, disabling the guest mode of the assistant-enabled device 104. In this case, the assistant-enabled device 104 is configured to suppress fulfillment of queries spoken by speakers who are not enrolled users 432 of the assistant-enabled device 104 when the guest mode is disabled. While the guest mode of the assistant-enabled device 104 is disabled, the method 500 includes, at operation 506, receiving audio data 402 corresponding to a query 106 captured by the assistant-enabled device 104, the query 106 including a command 118 for the digital assistant 105 to perform an action. The method 500 also includes, at operation 508, performing speaker identification 400 to determine that a speaker of the query 106 is not an enrolled user 432 of the assistant-enabled device. At operation 510, based on determining that the speaker of the query 106 is not an enrolled user 432 of the assistant-enabled device 104, the method 500 includes suppressing fulfillment of the action.

Figure 6:
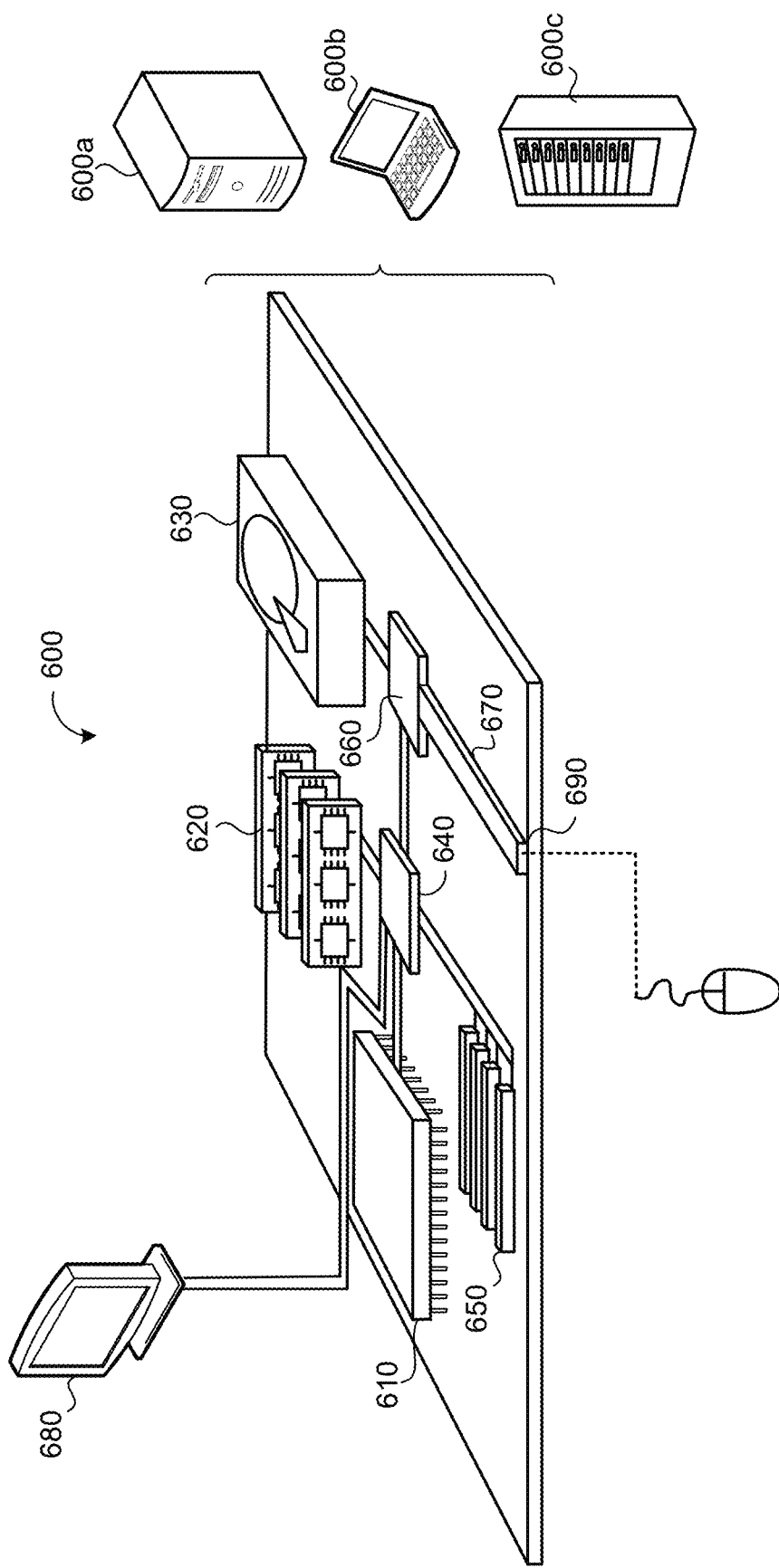
FIG. 6 is a schematic view of an example computing device that may be used to implement the systems and methods described herein.

FIG. 6 is a schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 (e.g., data processing hardware 10 and/or remote data processing hardware 132 of FIGS. 1A and 1B) can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 (e.g., memory hardware 12 and/or remote memory hardware 134 of FIGS. 1A and 1B) stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., universal serial bus (USB), Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and compact disc read-only memory (CD ROM) and digital versatile disk-read only memory (DVD-ROM) disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method when executed by data processing hardware causes the data processing hardware to perform operations comprising:
    while a guest mode of an assistant-enabled device is enabled:
        receiving sensor data captured by the assistant-enabled device, the sensor data comprising connection data indicating the assistant-enabled device is connected to another device;
        obtaining a current state of the assistant-enabled device based on the sensor data, wherein the assistant-enabled device is configured to allow a digital assistant to fulfill queries spoken by speakers who are not enrolled users of the assistant-enabled device when the guest mode is enabled; and
        based on the current state of the assistant-enabled device, automatically disabling the guest mode of the assistant-enabled device, the assistant-enabled device configured to suppress fulfillment of queries spoken by speakers who are not enrolled users of the assistant-enabled device when the guest mode is disabled; and
    while the guest mode of the assistant-enabled device is disabled:
        receiving audio data corresponding to a query captured by the assistant-enabled device, the query comprising a command for the digital assistant to perform an action;
        performing speaker identification to determine that a speaker of the query is not an enrolled user of the assistant-enabled device; and
        based on determining that the speaker of the query is not an enrolled user of the assistant-enabled device, suppressing fulfillment of the action.

2. The method of claim 1, wherein the sensor data further comprises at least one of:
    global positioning data;
    a signal strength of a wireless communication signal;
    image data;
    noise data;
    ambient context; or
    noise/speech data.

3. The method of claim 2, wherein obtaining the current state of the assistant-enabled device based on the sensor data comprises aggregating the sensor data to determine the current state of the assistant-enabled device.

4. The method of claim 1, wherein the operations further comprise:
    determining a device setting of the assistant-enabled device,
    wherein obtaining the current state of the assistant-enabled device is further based on the device setting of the assistant-enabled device.

5. The method of claim 1, wherein the operations further comprise adapting assistant features of the digital assistant based on disabling the guest mode of the assistant-enabled device.

6. The method of claim 1, wherein the operations further comprise, based on determining that the speaker of the query is not an enrolled user of the assistant-enabled device:
    prompting the enrolled user of the assistant-enabled device to authorize fulfillment of the action associated with the query;
    receiving an acknowledgement from the enrolled user authorizing the fulfillment of the action; and
    performing the action based on the acknowledgement received from the enrolled user.

7. The method of claim 6, wherein the operations further comprise activating a temporary user account for the speaker of the query for a predetermined time, the temporary user account allowing the digital assistant to fulfill queries spoken by the speaker within the predetermined time when the guest mode of the assistant-enabled device is disabled.

8. The method of claim 6, wherein:
    prompting the enrolled user comprises providing, as output from a user interface of a user device associated with the enrolled user, a user-selectable option that when selected issues the acknowledgement from the enrolled user; and wherein receiving the acknowledgement is based on receiving a user input indication indicating selection of the user-selectable option.

9. The method of claim 8, wherein providing the user-selectable option as output from the user interface comprises at least one of:
displaying, via the user interface, the user-selectable option as a graphical element on a screen of the user device associated with the enrolled user; or
providing, via the user interface, the user-selectable option as an audible output from a speaker in communication with the user device associated with the enrolled user.

10. The method of claim 9, wherein the user device associated with the enrolled user comprises the assistant-enabled device.

11. The method of claim 1, wherein performing speaker identification to determine that the speaker of the query is not an enrolled user of the assistant-enabled device comprises:
extracting, from the audio data corresponding to the query, a first speaker-discriminative vector representing characteristics of the query;
determining that the extracted speaker-discriminative vector does not match any enrolled speaker vectors stored on the assistant-enabled device, each enrolled speaker vector associated with a different respective enrolled user of the assistant-enabled device; and
based on determining that the first speaker-discriminative vector does not match one of the enrolled speaker vectors, determining that the query was not spoken by an enrolled user of the assistant-enabled device.

12. The method of claim 1, wherein the operations further comprise:
receiving image data from an image device in communication with the data processing hardware, the image data comprising a face of the speaker of the query,
wherein performing speaker identification to determine that the speaker of the query is not an enrolled user of the assistant-enabled device comprises performing speaker identification on the received image data to determine that the speaker of the query is not an enrolled user of the assistant-enabled device.

13. A system comprising:
data processing hardware; and
memory hardware in communication with the data processing hardware, the memory hardware storing instructions that when executed on the data processing hardware cause the data processing hardware to perform operations comprising:
while a guest mode of an assistant-enabled device is enabled:
receiving sensor data captured by the assistant-enabled device, the sensor data comprising connection data indicating the assistant-enabled device is connected to another device;
obtaining a current state of the assistant-enabled device based on the sensor data, wherein the assistant-enabled device is configured to allow a digital assistant to fulfill queries spoken by speakers who are not enrolled users of the assistant-enabled device when the guest mode is enabled; and
based on the current state of the assistant-enabled device, automatically disabling the guest mode of the assistant-enabled device, the assistant-enabled device configured to suppress fulfillment of queries spoken by speakers who are not enrolled users of the assistant-enabled device when the guest mode is disabled; and
while the guest mode of the assistant-enabled device is disabled:
receiving audio data corresponding to a query captured by the assistant-enabled device, the query comprising a command for the digital assistant to perform an action;
performing speaker identification to determine that a speaker of the query is not an enrolled user of the assistant-enabled device; and
based on determining that the speaker of the query is not an enrolled user of the assistant-enabled device, suppressing fulfillment of the action.

14. The system of claim 13, wherein the sensor data comprises at least one of:
global positioning data;
a signal strength of a wireless communication signal;
image data;
noise data;
ambient context; or
noise/speech data.

15. The system of claim 14, wherein obtaining the current state of the assistant-enabled device based on the sensor data comprises aggregating the sensor data to determine the current state of the assistant-enabled device.

16. The system of claim 13, wherein the operations further comprise:
determining a device setting of the assistant-enabled device,
wherein obtaining the current state of the assistant-enabled device is based on the device setting of the assistant-enabled device.

17. The system of claim 13, wherein the operations further comprise adapting assistant features of the digital assistant based on disabling the guest mode of the assistant-enabled device.

18. The system of claim 13, wherein the operations further comprise, based on determining that the speaker of the query is not an enrolled user of the assistant-enabled device:
prompting the enrolled user of the assistant-enabled device to authorize fulfillment of the action associated with the query;
receiving an acknowledgement from the enrolled user authorizing the fulfillment of the action; and
performing the action based on the acknowledgement received from the enrolled user.

19. The system of claim 18, wherein the operations further comprise activating a temporary user account for the speaker of the query for a predetermined time, the temporary user account allowing the digital assistant to fulfill queries spoken by the speaker within the predetermined time when the guest mode of the assistant-enabled device is disabled.

20. The system of claim 18, wherein:
prompting the enrolled user comprises providing, as output from a user interface of a user device associated with the enrolled user, a user-selectable option that when selected issues the acknowledgement from the enrolled user; and
wherein receiving the acknowledgement is based on receiving a user input indication indicating selection of the user-selectable option.

21. The system of claim 20, wherein providing the user-selectable option as output from the user interface comprises at least one of:

displaying, via the user interface, the user-selectable option as a graphical element on a screen of the user device associated with the enrolled user; or providing, via the user interface, the user-selectable option as an audible output from a speaker in communication with the user device associated with the enrolled user.

22. The system of claim 21, wherein the user device associated with the enrolled user comprises the assistant-enabled device.

23. The system of claim 13, wherein performing speaker identification to determine that the speaker of the query is not an enrolled user of the assistant-enabled device comprises:

extracting, from the audio data corresponding to the query, a first speaker-discriminative vector representing characteristics of the query;

determining that the extracted speaker-discriminative vector does not match any enrolled speaker vectors stored on the assistant-enabled device, each enrolled speaker vector associated with a different respective enrolled user of the assistant-enabled device; and based on determining that the first speaker-discriminative vector does not match one of the enrolled speaker vectors, determining that the query was not spoken by an enrolled user of the assistant-enabled device.

24. The system of claim 13, wherein the operations further comprise:

receiving image data from an image device in communication with the data processing hardware, the image data comprising a face of the speaker of the query, wherein performing speaker identification to determine that the speaker of the query is not an enrolled user of the assistant-enabled device comprises performing speaker identification on the received image data to determine that the speaker of the query is not an enrolled user of the assistant-enabled device.

* * * * *